A. SUNDH.
STEERING GEAR APPARATUS.
APPLICATION FILED SEPT. 21, 1905.

963,091.

Patented July 5, 1910.
3 SHEETS—SHEET 1.

WITNESSES:
Walter C. Strang
William H. Carlowitz

INVENTOR
August Sundh
BY
Chas. M. Nissen
ATTORNEY

A. SUNDH.
STEERING GEAR APPARATUS.
APPLICATION FILED SEPT. 21, 1905.

963,091.

Patented July 5, 1910.
3 SHEETS—SHEET 2.

Fig. 2

WITNESSES:
Walter C. Strang
William H. Carlowitz

INVENTOR
August Sundh
BY
Chas. M. Nissen
ATTORNEY

UNITED STATES PATENT OFFICE.

AUGUST SUNDH, OF YONKERS, NEW YORK.

STEERING-GEAR APPARATUS.

963,091.  Specification of Letters Patent.  Patented July 5, 1910.

Application filed September 21, 1905. Serial No. 279,387.

*To all whom it may concern:*

Be it known that I, AUGUST SUNDH, a citizen of the United States, residing at Yonkers, in the county of Westchester and State of New York, have invented a new and useful Improvement in Steering-Gear Apparatus, of which the following is a specification.

My invention relates to steering apparatus, particularly for vessels, and has for its object the provision of simple and efficient steering gear.

A further object of the invention is to provide electric controlling means for the steering gear.

An additional object is to provide auxiliary controlling apparatus which may be used in cases of emergency.

Other objects of my invention will appear hereinafter, the novel features being set forth in the claims.

Referring to the drawings.

1 designates the bed plate on which nearly all the parts of the system are mounted. Through lugs 2, 2' secured to the bed-plate pass the bolts 3, 3', the lower ends of which have heads 4, 4' and the upper ends of which are threaded to receive the nuts 5, 5'. Mounted rotatably on these bolts 3, 3' are annular or internal gear wheels 11, 11' and sprockets 9, 9'. The annular gears are keyed by means of the removable keys 7, 7' and 8, 8' to the sprockets 9, 9' so that they will rotate together. Metallic sleeves or bushings 50, 50' fit on the upper part of the bolts 3, 3' and extend between the washers 6, 6' and the upper flat portions of the lugs 2, 2'. The nuts 5, 5' clamp the washers, sleeves and bolts securely in place. The annular gears and sprockets, however, are loosely mounted on said sleeve and are free to rotate, the bearings for the same being formed by the outer cylindrical surfaces of said sleeves, by said washers and by the upper flat portion of the lugs 2, 2'.

To the standard 42, which is herein shown integral with the bed-plate 1, are rigidly connected the motors 16 and 17. These motors are mounted so as to have vertical positions. The armature shafts 14 and 15 extend downwardly and protrude from the motor frames. To the extended ends are keyed the pinions 13, 13' which mesh with the internal gears 11, 11', respectively. It will be noticed that the motors are mounted on opposite sides of the standards 42, and that the various shafts are substantially in the same plane (see Fig. 2). This exact arrangement, however, is not essential and may be varied as desired.

Figure 1:
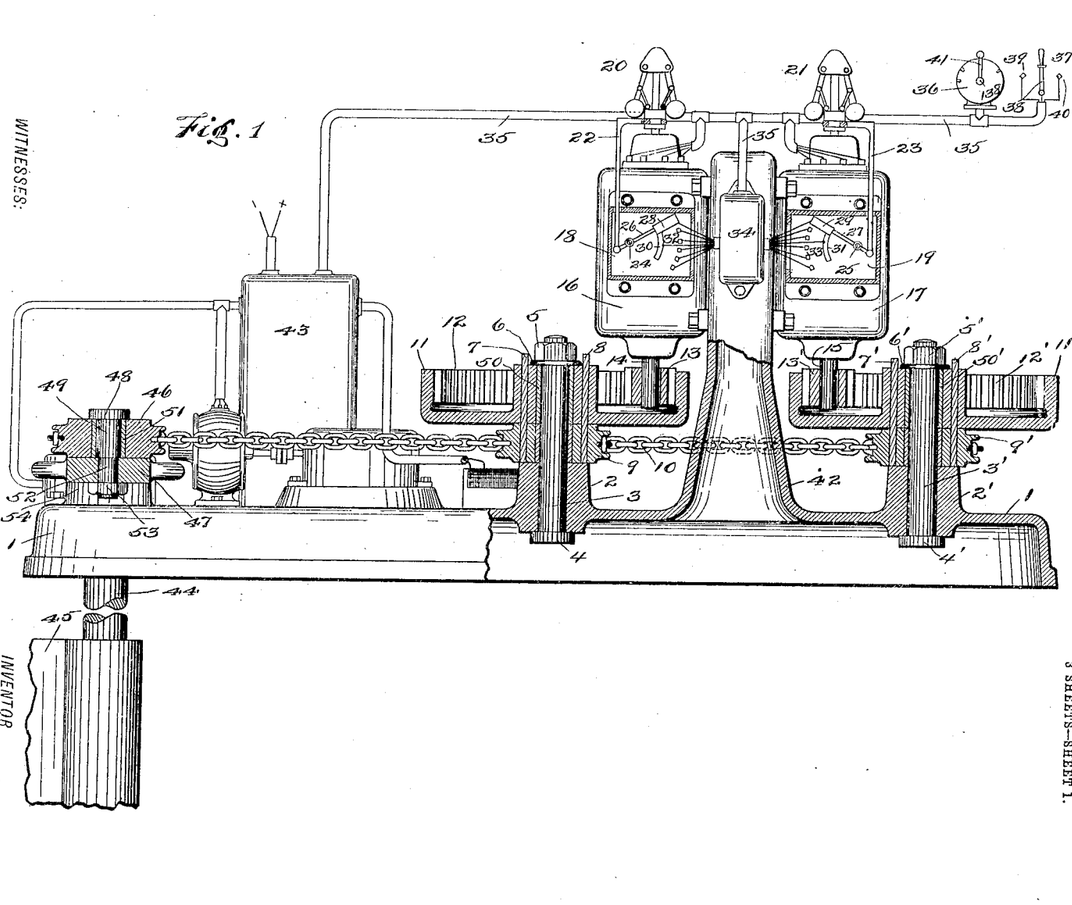
Figure 1 represents an elevation, partly in section, of my complete steering gear apparatus and controlling means therefor.

At the extreme left-hand portion of Fig. 1 is shown a rudder post 44 of a rudder 45. This rudder post passes up through the lug 54 on the bed-plate and is keyed to the tiller, 47 shown in Fig. 2 in plan. At the outer ends of the tiller 47 are mounted the sprocket pulleys 46, 46' on bearings which are fixed to said tiller. The construction of these bearings is shown in Fig. 1. A bolt 49 has a cut-away portion 52 which fits in a hole in the tiller and is screw threaded at its lower end to receive the nut 53. A metallic sleeve 51 fits on the upper portion of the bolt and extends between the bolt head and the upper flat surface of the tiller at this point. It is therefore apparent that the bolt and sleeve may be securely clamped to the tiller while the sprocket pulleys are free to rotate.

Figure 2:
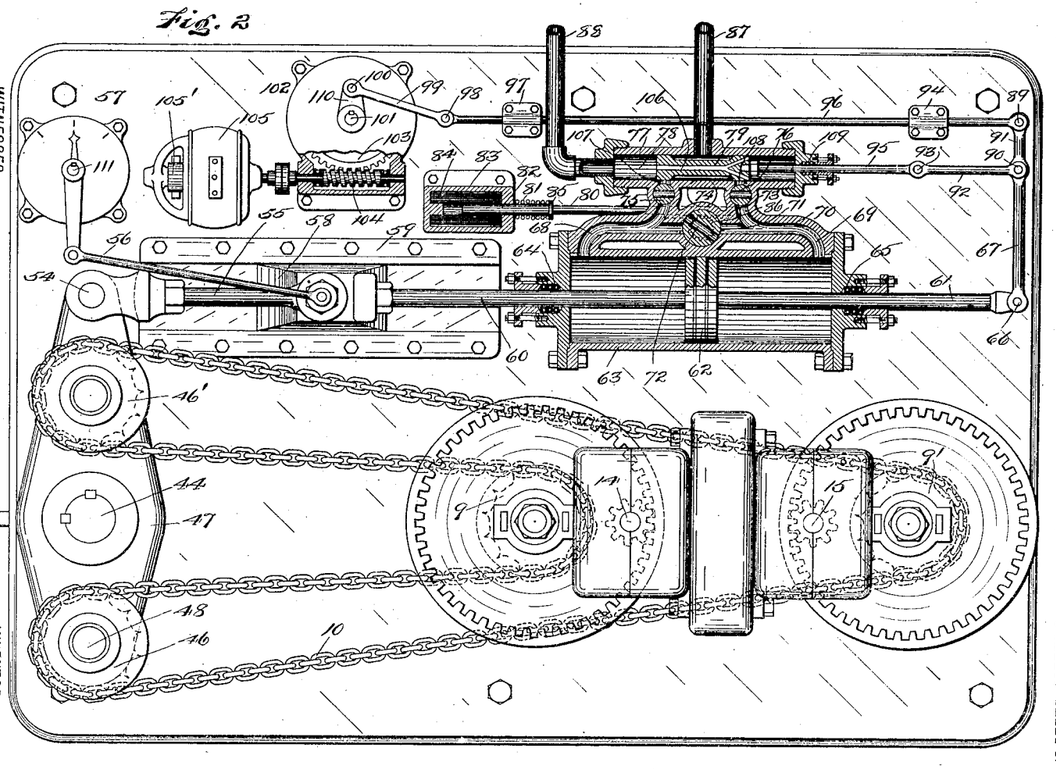
Fig. 2 is a plan view of the same.

As seen in Fig. 2 the endless chain 10 passes around the sprocket pulleys 9, 9' in opposite directions and around the pulleys 46, 46' in the same direction. The chain is so connected for the reason that it is desired to have the motors rotate continuously in opposite directions. When the motors and consequently the pinions 14, 15 on their shafts, rotate at the same rate of speed, the sprocket pulleys 9, 9' will drive the chain 10 and the sprocket pulleys 46, 46' but no pull will be exerted on either arm of the tiller to move the latter from its position. If, however, one motor rotates faster than the other, then the tiller will be rotated in a certain direction and the position of the rudder changed. For instance, if the armature shaft 15 rotates in a clockwise direction faster than the armature shaft 14 does in the opposite direction, the sprocket pulley 9' will take up the chain 10 faster than the sprocket pulley 9 can pay it out. There will consequently be a pull exerted on the pulley 46' to rotate the rudder post 44 in a clockwise direction, the slack in the chain 10 being taken up by the other pulley 46 during the movement of the tiller.

Should the electric motors or motor controlling means become inoperative or if the current supply should fail or be cut off the tiller may be operated by the fluid pressure apparatus shown in the upper part of Fig. 2. In this case the motor-armatures may be left free to rotate or disconnected, or the chain 10 may be entirely disconnected. The bearings for the pulleys 46, 46' are shown substantially at the same distances from the rudder post 44 but it is seen that the upper arm of the tiller is longer than the lower arm as viewed in Fig. 2. Pivoted at 54 to the longer arm is a link 55 which is also pivoted to the cross-head 58. This cross-head is movable in the guideways 59 and has rigidly connected to it the piston rod 60 which passes through the stuffing box 64 and is secured to the piston 62. Another piston rod 61 is secured to the other side of the piston and extends to the right through the stuffing box 65, being connected at the outer end 66 to the link 67. The piston 62 is provided with a cylinder 63 which has ports 68, 69 at its ends near the cylinder heads.

The valve mechanism for controlling the movement of the piston 62 is shown attached to the cylinder 63. A by-pass 70 communicates with the ports 68, 69 and has a rotary valve 71 in its central portion, said valve being normally in closed position as shown in Fig. 2. In order to open the valve the electro-magnet solenoid 84 must be energized. The core 82 will then be drawn inwardly against the action of the spring 81 which is placed between the collar 85 and the magnet frame 83, and operate the rack and pinion connection to the valve 71. This is accomplished by means of the rod 80 which is secured to the plunger 82 and has a rack 73 at its outer end meshing with the pinion, 86. An idle pulley 74 serves as a guide for the rack bar and keeps the rack in mesh with the pinion 86. This pinion is rigidly secured to the valve 71 so that when the solenoid is energized the valve port 72 will register with the by-pass 70 and allow the piston 62 to move freely back and forth.

Figure 3:
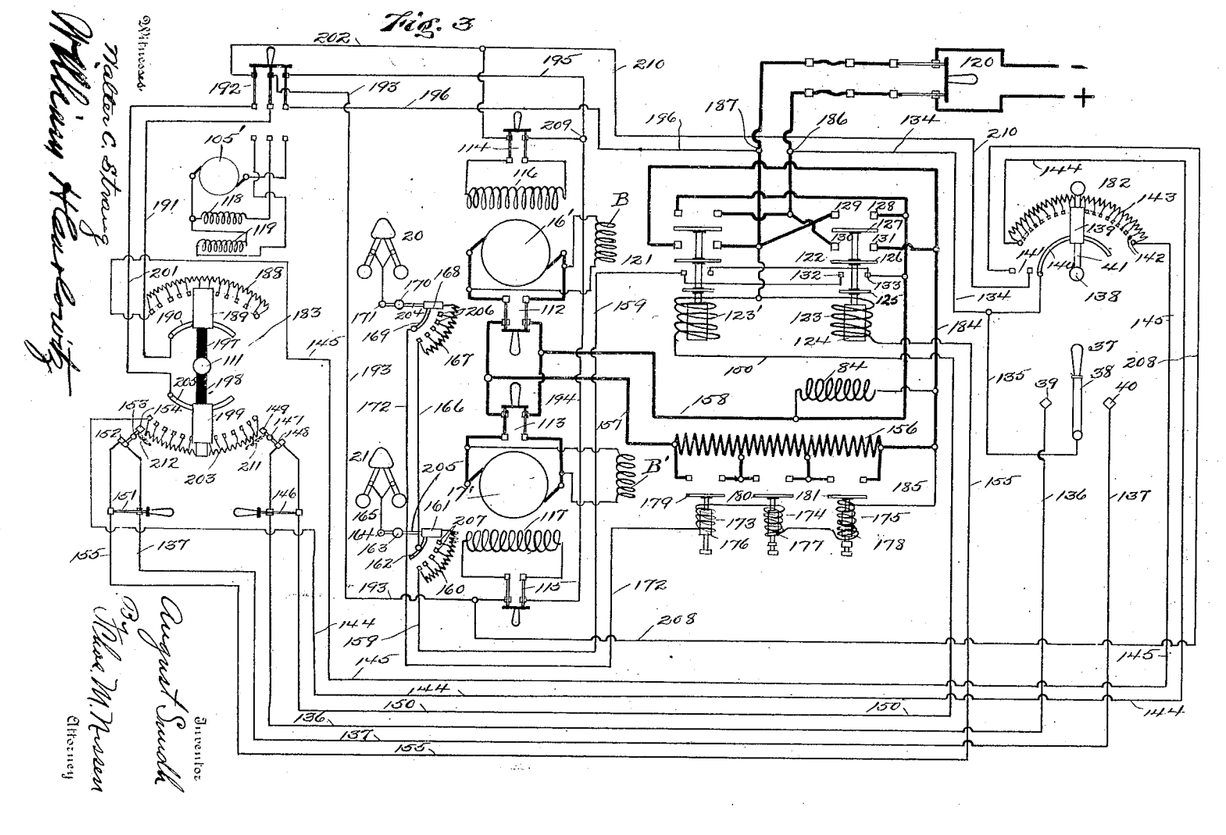
Fig. 3 is a diagram of the circuits and connections of the electric controlling apparatus.

During the normal operation of the steering apparatus, that is, when the controlling system shown in Fig. 3 is operative, fluid such as oil or water fills the cylinder 63, which with the parts already described or connected thereto constitute a brake to stop and hold the rudder and gearing stationary. When, however, the electric controlling apparatus is out of order, the valves 75 and 76 in the branch pipes leading from the by-pass 70 are opened so that the controlling valve mechanism may be effective in controlling the motor-fluid which is to positively actuate the piston 62. The brake device will then be changed into a driving apparatus, preferably hydraulic. The supply pipe 87 is connected to the valve casing 77 at its central portion and when the valve 79 is in the position shown in Fig. 2 no fluid can flow as the ports 107 and 108 will be closed by the ends of the piston and communication with the exhaust pipe 88 will also be closed.

In order to move the controlling valve piston 79 the piston rod 95 secured to the right thereof and extending through the stuffing box 109, must be moved by means of the motor 105 and the intermediate connections. These connections comprise a worm 104 directly connected to the armature shaft and mounted in bearings in the housing 102. In suitable bearings of this housing is mounted the worm wheel 103 adapted to be driven by the worm wheel 104. Keyed to the shaft 101 of the worm wheel is a crank arm 110 to the outer end of which is pivoted the link 99. A sliding rod 96 is mounted in guides 97 and 94, and is pivotally connected to the link 99 at one end 98 and to one end 89 of the link 67 at its other end at 89. The other end 66 of the link 67 is pivotally connected to the motor piston rod 61 and at an intermediate point 90 on said link 67 is pivoted the link 92 which is also pivotally connected at 93 to the controlling valve piston rod 95. It is seen that there is a main motor piston for driving the rudder in either direction through the piston rod 60 and other connections, a valve for controlling this hydraulic motor, and an auxiliary apparatus driven by a small electric motor for operating said controlling valve. If the motor 105 should be run in a direction to move the sliding rod 96 to the right the lever 67 would be moved about the pivot 66 as a fulcrum and draw the piston 79 to the right. The central portion of the cylindrical surface of this piston is cut away as shown in Fig. 2 so that a slight movement to the right is sufficient to establish communication between the supply pipe 87 and the port 69, and to establish communication between the exhaust pipe 88 and the port 68. Pressure will therefore be exerted on the right of the motor piston 62 and the fluid to the left of said piston exhausted. The rudder will obviously in such a case be moved in a counter-clockwise direction.

The small motor 105 may be stopped as soon as the controlling valve is brought to its open position and hold the rod 96 in its right-hand position. When the motor valve piston starts to move it returns the pilot valve back to its closed position, the lever 67 being moved on the pivot 89 as a fulcrum. This will effect a positive stop of the rudder at the limit of its movement and hold the same there. The rudder may be similarly stopped in its central position or at its other limit of movement. An indicator 57 is connected by the link 56 to the cross-head 58 to indicate these three positions of the rudder. It is to be understood, however, that the rudder may be placed also in any intermediate position by reversing the motor and thus bring the controlling valve back to central position to stop the motor piston 62. The intermediate positions are also indicated on the indicator and by observing the latter the small motor 105 may be started, stopped or reversed to obtain exactly the desired movement of the rudder.

Referring now to Fig. 3, the electric controlling apparatus for the electric motors will be explained. + and − designate the mains, 121 and 122 the reversing switches, 16′ and 17′ the motor-armatures, 116 and 117 the field coils of the motors, 156 the sectional starting resistance, 182 the master switch, 37 the reversing switch, 183 the automatic balancing switch and 20 and 21 the automatic governors to control the resistances 167 and 160, respectively.

The operation is as follows: Let the lever 38 of the reversing switch 37 be thrown to the right to engage the contact 40 when a circuit will be closed from the + main through wires 134, 135, lever 38, contact 40, wire 137, contacts 152 (the switch 151 being open), wire 155, solenoid 123, to the − main. The core 124 of the solenoid 123 will then be drawn upwardly until the contact disks 125, 126, 127, respectively, connect the contacts 132, 133 and 130, 131 and 129, 128. A circuit may now be traced through the heavy black lines from the + main by way of contacts 130, 131, contact disk 126, sectional resistance 156, wire 157, switches 112, 113 and motor armatures 16′, 17′ in parallel, wire 158, contacts 128, 129, contact disk 127, to the − main. At the same time an additional circuit is closed from the + main through the contacts 130, 131, contact disk 126, wires 184, 185, solenoids 175, 174, 173, wire 172, contact strip 169, wiper 168, resistance 167, wire 166, contact strip 162, wiper 161, resistance 160, wire 159, contacts 132, 133, contact disk 125, contacts 128, 129 and contact disk 127, to the − main. Also at the same time the circuit through the solenoid 84 is closed directly across the mains. Brake magnets B and B′ to release brake applying means associated with the motor-armature may also be connected across the mains in a similar manner, if desired. The valves 75 and 76 being closed, the energization of the solenoid 84 will effect the opening of the valve 72 and thus permit the piston 62 of the brake shown in Fig. 2 to move freely in either direction. But this piston will not be moved unless there is a variation in speed of the two motor-armatures 16′ and 17′.

When the main line switch is closed and the starting switch 37 placed in its right-hand position a circuit is immediately established through the motor-fields which circuit may be traced as follows: from the + main at the point 186, to and through the wire 134, arc contact strip 140, wiper 139 fixed to the arm 41 which is pivoted at 138, contacts 142, right-hand portion of the resistance 143 of the master switch 182, wire 145, left-hand portion of resistance 188, wiper 189 fixed to arm 197 which is pivoted at 111, arc strip 190, wire 191, switch 192, wire 193, field switch 115, field coil 117, wires 194, 195, switch 192, wire 196, to the point 187 on the − main. A circuit through the field coil 116 in parallel to the field coil 117 may be traced as follows: from contact strip 140 and wiper 139 through the left-hand portion of resistance 143 of the master switch, wire 144, left-hand portion of resistance 203 of the automatic balancing switch 183, wiper 199 and contact strip 200, wire 201, switch 192, wire 202, field switch 114, field coil 116, wire 195, switch 192, wire 196 to the − main.

It will be noticed that the solenoids of the accelerating magnets are in series with each other and that the resistances 160 and 167 are also in series with them. Furthermore, the accelerating magnetic switches are so connected that one will operate after the other and thus gradually cut out the sectional resistance 156 to allow more current to flow through the motor-armatures. One way of accomplishing this result would be to have the magnets wound with different numbers of turns of wire. It should also be noted that the accelerating magnets are connected in a circuit across the constant potential mains and not across the motor-armature terminals as is usual. The energization of the accelerating magnets is therefore independent of the armature potential. The energization of the accelerating magnets is dependent, however, upon the speed of the motor-armatures.

When a reversing switch has been operated to close the field circuits and armature circuits in parallel as explained the motors will start to rotate in opposite directions at equal rates of speed. As they do so the centrifugal governors 20 and 21 which are connected respectively at 171 and 164 to levers 204 and 205 will begin to turn said levers about their pivots and move the wipers 168 and 161, which are secured to said levers, over the contact strips 169 and 162 and the contacts 206 and 207. This automatic operation will result in the resistances 167 and 160 being gradually cut out as the motor-armatures increase in speed. The solenoids 173, 174 and 175 of the accelerating magnets will therefore gradually be increased in strength and one switch after the other closed to gradually cut out the motor starting resistance 156.

As hereinbefore explained, so long as the motors run at the same speed the rudder post will remain stationary. In order to obtain a difference of speed between the motors which may be regulated, the master switch 182 has been provided to change the relative strengths of the fields. And to automatically bring the motors back to normal running so as to stop the rudder in the desired position the automatic balancing switch 183 has been devised.

After the motors have been run up to full speed and are running in opposite directions, suppose it is desired to turn the rudder in a clockwise direction as viewed in Fig. 2. The lever of the master switch 182 is turned to the left in which case the resistance 143 in series with the field coil 117 will be increased and that in series with the field coil 116 will be simultaneously diminished. The motor-armature 17' will therefore increase in speed while at the same time the motor-armature 16' will diminish in speed. The right-hand motor 17 in Fig. 2 will therefore run faster than the left-hand one and therefore the rudder post will be turned in a clockwise direction as before explained. As soon as the rudder begins to move, however, the cross-head 58, Fig. 2, will also move and rotate the shaft 111 in an anti-clockwise direction. The arms 197 and 198 of the balancing switch 183 are secured to this shaft so that the resistances 188 and 203 will be intermediately varied. The resistance 188 in series with the right-hand resistance 143 will be decreased and the resistance 203 in series with the left-hand resistance 143 will be increased. Consequently after the rudder has moved a certain distance proportional to the movement of the lever of the master switch the motors will again rotate at the same rate of speed and the rudder will stop in the desired position. It should be noted that the direction of movement of the master switch 182 depends upon the position of the manual reversing switch 37 and that so long as the latter switch is in one of its closed positions the magnet 84 will be energized to hold the valve 86 open and allow free movement of the motor piston 62. Should it be desired, therefore, to positively stop the rudder so as to take the strain from the gear mechanism due to the momentum of the rudder the switch 37 must be opened. So long as the switch is in open position the rudder would be held by the hydraulic brake in fixed position.

When the master switch is placed in one of its extreme resistance engaging positions the rudder will be correspondingly moved and during such movement all the resistances 188 and 203 of the balancing switch will be thrown in series with field coils. It is preferable to provide some means for preventing the rudder from being moved too far and producing too great a strain on the same and its connections with the vessel. I therefore place cut out or limit switches comprising the contacts 148 and 152 at the limits of movement of the arm 198 of the balancing switch. The end of this arm is adapted to strike against the ends 149, 154 of the levers which are pivoted at 147 and 153 and normally held in place by the springs 211 and 212. For instance, if the reversing switch 122 has been operated and the motors are running at different rates of speed to turn the rudder to one of its limiting positions, the first step in the operation of the safety mechanism is preferably to cut out all resistance from in circuit with the field coils which is done by connecting the contacts 141. This has the effect of not only causing the motors to run at the same rates of speed but also to slow down the speed of the same. If desired this slowing down may be to such an extent as to cause the centrifugal governors 20 and 21 and the connections therewith to reinsert the resistances 167 and 160. This would cause the accelerating magnetic switches to open and reinsert the starting resistance and thus still further reduce the speed of the motors. By this time the rudder will have moved to its limiting position when the lower end of the arm 198 would effect the opening of the contacts 152. The switch 151 being open and the contacts 152 being in series with the solenoid 123 of the reversing switch 122, the latter will drop back to its original position when said contacts are opened. This would cause all the apparatus to come to a standstill for when the reversing switch is opened the circuits to the motors and the magnet solenoid 84 are cut off. The deënergization of the solenoid 84 will effect the closing of the valve 72 in the by-pass 70 and the hydraulic brake will come into operation to positively stop the rudder. It is advantageous to have an automatic slowdown arrangement as described come into operation as the rudder approaches the limits of its movement for in that case the rudder may safely be operated at intermediate points much more rapidly.

Should either motor become inoperative the other may of course be used alone but in that event the motor would have to be started, stopped each time the rudder's position is to be changed and also frequently reversed. If both motors and their connections were always in operative condition only one electromagnetic switch and a manual switch therefor would be necessary. The arrangement as shown including the reversing switches 121 and 122 and the manual switch 37 are primarily for the purpose of controlling the position of the rudder if one motor should become inoperative or if it be desired to use only one motor. In such case the armature shaft of the motor not to be used is preferably disconnected from the apparatus. The lever 41 of the master switch 182 is brought to its extreme left-hand position so as to connect the contacts 141 and thus cut out the resistance 143 and the balancing rheostat 183. The switches 151 and 146 are kept in open position as is preferably done also when both motors are used. The armature switch and field switch of the motor not to be operated are also opened. Let it be assumed that only the motor 17 is to operate in which case the armature switch 112 and field switch 114 must be opened. The direction of motion of the rudder will now be dependent upon the position of the manual controlling switch 37 for it is obvious that if the lever is moved into engagement with the contact 39 the reversing switch 121 will be operated to move the rudder in one direction whereas if the lever 38 engages contact 40 the reversing switch 122 will be operated and the rudder will move in the other direction.

When the wiper 139 connects the contacts 141 and the lever 38 is brought into engagement with contact 39 a current will flow through the following circuit: from + main by wires 134 and 135 to lever 38, contact 39, and through wires 136, normally closed contacts 148, wire 150, solenoid 123' of reversing switch 121 to the − main. When the lever 38 engages contact 40 a current will flow through the contacts 152, and solenoid 123 of reversing switch 122 to the − main. In either case the motor circuit will be closed and the starting resistance gradually cut out. It should be noted that when one motor is thus used alone the reversing switch last operated is deënergized, and so also the magnet 84, each time the switch 37 is brought to open position. This has the effect of bringing the rudder to a positive stop and holding the same in fixed position at each time the hydraulic brake is applied. Furthermore it is of greater necessity to have an indicator like that shown at 57 before the operator in order to know what position the rudder is in. When the master switch 182 is used the indicator is not so essential as the position of the lever 41 corresponds to the position of the rudder.

When only one motor is employed the balancing rheostat 183 is ineffective so far as the resistances 188 and 203 are concerned but it still serves the purpose of automatically stopping the rudder at the limits of its intended travel by opening the limit switches 148 or 152 and thus breaking the circuit to the reversing switch which is in closed position, and effecting the application of the hydraulic brake to stop the rudder. Should both motors become inoperative, the hydraulic mechanism is brought into operation. The valve 72 (Fig. 2) remains closed but the valves 75 and 76 are opened. The keys 7, 8, 7', 8', are preferably removed or if desired the chain 10 may be also removed. The switch 192 (Fig. 3) is thrown to its lower position to connect the auxiliary motor-armature 105' with its field coils 118 and 119 in circuit with the controlling apparatus. The field coils 118 and 119 are oppositely wound so that when the master switch 182 is in its central position as shown in Fig. 3, the motor will not operate although the switch 37 is in one of its closed positions, one of the reversing switches closed, and the auxiliary motor 105 receives current. When the master switch is moved from its central position one field coil is strengthened and the other weakened, and therefore the motor will start to move the valve 79 to one side or the other and permit the motor piston 62 to be moved. This will cause the rudder to be moved and when it does so the auxiliary motor fields are again neutralized by the balancing switch 183.

The operation of the controlling system when the auxiliary motor is in circuit will now be explained. The switches 112, 113, 114 and 115 being in open position and the switch 192 in its lower closed position, let the switch 37 be thrown to its right-hand position. A circuit will then be closed from the + main through wire 134, switch arm 38, contact 40, wires 137 and 155, solenoid 123, to the − main. The reversing switch 122 will thereupon be operated to close a circuit through the motor 105 as follows: from the + main by wire 134 to contact strip 140, wiper 139 and thence in parallel through the two portions of the resistance 143, wires 144 and 145, resistances 203 and 188 of the balancing rheostat 183, wipers 199 and 189, contact strips 200 and 190, wires 201 and 191, switch 192, field coils 119 and 118, to and through the motor-armature 105', wire 196, to the − main. If the master switch is placed in a right-hand position resistance will be cut out from in circuit with the field coil 118 and some inserted in circuit with the field coil 119. This will cause the auxiliary motor to start and move the valve 79 to the right. The fluid pressure will then move the motor piston 62 to the left and the rudder post in an anti-clockwise direction. While doing so the balancing rheostat will be operated to equalize the strength of the fields 118 and 119 and the motor will therefore stop. The apparatus is so constructed that it shall operate to effect a closure of the valve 79 while the rudder is being moved to its desired position. There may be a differential motion of the rods 96 and 61 to cause a gradual closing of the valve 79 or preferably the motor is so constructed and connected as not to operate with a weak field in which case the motor will stop before the rudder will and the continued movement of the motor piston 62 will effect a movement of the lever 67 on the pivot 89 as a fulcrum, to bring the valve 79 to closed position when the rudder will be positively stopped and held in fixed position.

When the switch 192 is in its lower position the contacts 141 are always deënergized. The contacts 148 and 152 of the balancing rheostat, however, will again come into operation to deënergize the reversing switch and thus cut off current to the auxiliary motor when the rudder reaches either extreme limit of its motion. The contacts 148 are in circuit with the solenoid 123 of the reversing switch 122. It is obvious that if the rudder reaches its limiting position, either by means of the differential motors and mechanism or by means of the hydraulic apparatus and auxiliary motor, it will be held there, in the first instance by reason of the by-pass being closed, and in the second instance by reason of the valve 79 being in closed or central position. In the first case, if it is desired to release the rudder, the master switch is brought to central position and the manual switch 146 or 151 thrown to its closed position to effect the operation of the reversing switch other than the one which has last operated.

The only controlling apparatus required to operate the auxiliary motor apparatus is the master switch, rheostat 182, the automatic balancing rheostat 183, and the circuits therefor, the reversing switches and accelerating apparatus being ineffective. In order to reverse the direction of rotation of the auxiliary motor-armature the switch lever 41 is simply thrown in the opposite direction, the direction of rotation of the auxiliary motor being dependent upon which field coil carries the most current. If the field 119 is stronger than the field 118 the armature will turn in one direction and when the field 118 is stronger than the field 119 it will turn in the opposite direction.

Having thus fully described my invention, and without limiting myself to any of the details of construction or arrangement of parts, what I claim and desire to have protected by Letters Patent of the United States is:—

1. The combination with a motor, of motor-controlling means comprising electromagnetic switches having windings in series with each other, and automatic means operated by the motor for controlling the current through said windings to effect the operation of said switches.

2. The combination with a motor, of sectional starting resistance therefor, electric switches for modifying said resistance, accelerating magnets having windings connected in series with each other, and automatic means operated by the motor for controlling said magnets.

3. The combination with an electric motor, of sectional starting resistance therefor, electromagnetic switches for modifying said resistance and having windings in series with each other, and means directly governed by the speed of the motor for automatically controlling and operating said electromagnetic switches.

4. The combination with a motor, of starting resistance therefor, accelerating magnets connected in series with each other across the main lines, and a speed governor for automatically controlling said magnets.

5. The combination with a motor, of starting resistance therefor, magnetic switches for varying the amount of current through said resistance and having windings in series with each other across the mains, resistance normally in circuit with said windings, and means actuated by the motor for regulating said resistance to effect the operation of said switches.

6. The combination with an electric motor, of starting resistance, electromagnetic switches for modifying said resistance and having windings connected in circuit across the mains, and means driven by the motor for automatically controlling said switches.

7. The combination with an electric motor, of sectional starting resistance therefor, electric switches, accelerating magnets for operating said switches and having windings connected in series with each other, a resistance in series with said magnets, and means dependent on the speed of the motor for varying said resistance.

8. The combination with an electric motor, of starting resistance therefor, accelerating magnetic switches, and a rheostat operatively connected to the motor for operating said switches.

9. The combination with an electric motor, of starting resistance therefor, of accelerating magnetic switches for modifying said resistance, a variable rheostat connected in circuit with the windings of said magnetic switches, and a governor driven by the motor for effecting a regulation of the amount of current through said windings.

10. The combination with an electric motor, of a sectional starting resistance therefor, electric switches for modifying said resistance, electromagnets for operating said switches, the windings of said electromagnets being connected in series with each other across the mains, a variable rheostat in series with said windings, and means controlled by the motor for operating said rheostat to regulate the amount of current through said windings.

11. The combination with a plurality of motors, of starting resistance therefor, electromagnetic switches for modifying said resistance, and having windings connected in series with each other, a plurality of variable rheostats one associated with each motor, and means controlled by the motors for operating said rheostats to regulate the current through said windings.

12. The combination with two motors connected in circuit with each other, of starting resistance for said motors, electromagnetic switches for modifying said resistance and having windings in series with each other, two variable rheostats connected in series with said windings across the mains, and means controlled by said motors for operating said rheostats to regulate the current through said windings.

13. The combination with a motor, of starting resistance therefor, electromagnetic switches for modifying said resistance and comprising windings connected in series with each other in a normally open circuit, an additional resistance in said circuit, means for closing said circuit, and means controlled by the motor for varying said additional resistance to effect an acceleration of the motor from the starting point to the desired speed.

14. The combination with a motor, of starting resistance and a normally open circuit for said motor, switches for modifying said resistance, electromagnets in a normally open controlling circuit for operating said switches in successive order, a variable rheostat for regulating the current through said electromagnets, means for operating said rheostat, and means for closing the motor circuit and also the controlling circuit to effect a starting and accelerating of the motor.

15. The combination with a plurality of motors operable normally at a predetermined relative speed, of a body to be moved, a rotatable member geared to each motor to be driven at a speed proportional to that of the motor, an endless power transmission member forming a connection between said rotatable members and said body, means for varying the speeds of said motors inversely to effect the desired movement of said body, and means operated by said body for effecting a return of the motors to said normal relative speed.

16. In steering apparatus for vessels, the combination with two motors connected to run in opposite directions, of a rotatable member geared to each motor to be driven at a speed proportional to the speed of the motor, a rudder, a tiller connected to the rudder post, sprocket and chain connections extending from said tiller to said rotatable members, and means for controlling the relative speed of said motors to control said rudder.

17. The combination with an electric motor, of motor-controlling means, a pinion on the shaft of said motor, an internal gear meshing with said pinion, a sprocket connected to rotate with said gear, a rudder, a rudder post, a tiller having two arms and secured to said post, additional sprockets one at or near the outer end of each of said arms, and a chain engaging all of said sprockets.

18. The combination with a plurality of motors, of a plurality of pinions one for each motor, a plurality of gears meshing respectively with said pinions, sprockets carried by said gears, a body to be moved, additional sprockets on said body, and a chain engaging all of said sprockets.

19. The combination with two motors, of a body to be moved, a sprocket wheel geared to each motor for rotation at a speed proportional to that of the motor, motor controlling means operable to vary differentially the speeds of the motors, sprocket wheels connected to said body, a sprocket chain coöperating with said sprocket wheels and forming therewith differential power transmitting apparatus, and means operated by said body for effecting an automatic restoration of the motors to their normal relative speed.

20. The combination with two motors connected to run in opposite directions, of motor-controlling means for starting and accelerating either or both of said motors, means for varying the relative speeds of said motors, a body to be moved, sprocket and chain connections between said motors and said body, and means automatically operated by the movement of said body for equalizing the speeds of said motors.

21. The combination with two motors with their shafts each substantially vertical, of pinions one on the lower end of each of said shafts, internal gears meshing with said pinions, sprockets one connected to each gear to rotate therewith, a rudder, a rudder post, a tiller, additional sprockets on said tiller, and a sprocket chain for all of said sprockets.

22. The combination with two motors connected to rotate in opposite directions, of gear mechanism, a rudder, sprocket and chain connection between said rudder and said gear mechanism, means for changing the relative speeds of said motors to effect a movement of said rudder, means for equalizing the speeds of said motors to stop the rudder, and mechanical connections between said rudder and said equalizing means.

23. The combination with motors, of means for controlling said motors, a rudder, a tiller connected to said rudder, power transmitting mechanism between said motors and said tiller, a brake, connections between said brake and one arm of the tiller, and means for controlling said brake.

24. The combination with motors, of a rudder, connections between said motors and rudder, a brake, mechanical connections between said brake and said rudder, means for controlling said brake, and means co-acting with said brake for actuating said mechanical connections to move the rudder with or without altering the first-named connections.

25. The combination with two motors, of motor-controlling means, a body to be moved, connections between said body and said motors permitting either motor to be used alone to effect the desired movement of said body or both to be used differentially to operate said body and connections, a brake for stopping and holding said body in fixed position, means for controlling said brake, and a cross-head and guide connection between said brake and said body.

In testimony whereof, I have signed my name to this specification in the presence of two subscribing witnesses.

AUGUST SUNDH.

Witnesses:
CHARLES M. NISSEN,
WALTER C. STRANG.